United States Patent
Wen et al.

(10) Patent No.: US 8,209,690 B2
(45) Date of Patent: Jun. 26, 2012

(54) SYSTEM AND METHOD FOR THREAD HANDLING IN MULTITHREADED PARALLEL COMPUTING OF NESTED THREADS

(75) Inventors: Xingzhi Wen, Cupertino, CA (US); Uzi Yehoshua Vishkin, Potomac, MD (US)

(73) Assignee: University of Maryland, College Park, MD (US)

( * ) Notice: Subject to any disclaimer, the term of this patent is extended or adjusted under 35 U.S.C. 154(b) by 838 days.

(21) Appl. No.: 12/158,004

(22) PCT Filed: Jan. 19, 2007

(86) PCT No.: PCT/US2007/001501
§ 371 (c)(1),
(2), (4) Date: Dec. 29, 2008

(87) PCT Pub. No.: WO2007/084700
PCT Pub. Date: Jul. 26, 2007

(65) Prior Publication Data
US 2009/0125907 A1    May 14, 2009

Related U.S. Application Data (60) Provisional application No. 60/743,146, filed on Jan. 19, 2006.

(51) Int. Cl.
G06F 9/46 (2006.01)
G06F 15/00 (2006.01)
(52) U.S. Cl. .......................................... 718/101; 712/30
(58) Field of Classification Search .................. 718/101; 712/30, E09.016
See application file for complete search history.

(56) References Cited

U.S. PATENT DOCUMENTS

| | | | |
|---|---|---|---|
| 5,050,070 A | 9/1991 | Chastain et al. | |
| 6,463,527 B1 | 10/2002 | Vishkin | |
| 6,542,918 B1 | 4/2003 | Vishkin | |
| 6,768,336 B2 | 7/2004 | Vishkin et al. | |
| 7,243,345 B2* | 7/2007 | Ohsawa et al. | 717/149 |
| 7,313,676 B2* | 12/2007 | Brekelbaum et al. | 712/217 |

(Continued)

OTHER PUBLICATIONS

Ramachandran et al., "Emulations Between QSM, BSP and LogP: A Framework for General-Purpose Parallel Algorithm Design", www.cs.utexas.edu, S957.

(Continued)

*Primary Examiner* — Thomas Lee
*Assistant Examiner* — Phil Nguyen
(74) *Attorney, Agent, or Firm* — Carter, DeLuca, Farrell & Schmidt, LLP (57) ABSTRACT

An Explicit Multi-Threading (XMT) system and method is provided for processing multiple spawned threads associated with SPAWN-type commands of an XMT program. The method includes executing a plurality of child threads by a plurality of TCUs including a first TCU executing a child thread which is allocated to it; completing execution of the child thread by the first TCU; announcing that the first TCU is available to execute another child thread; executing by a second TCU a parent child thread that includes a nested spawn-type command for spawning additional child threads of the plurality of child threads, wherein the parent child thread is related in a parent-child relationship to the child threads that are spawned in conjunction with the nested spawn-type command; assigning a thread ID (TID) to each child thread, wherein the TID is unique with respect to the other TIDs; and allocating a new child thread to the first TCU.

33 Claims, 3 Drawing Sheets

U.S. PATENT DOCUMENTS

| | | | |
|---|---|---|---|
| 7,366,816 B2* | 4/2008 | Rai | 710/307 |
| 7,530,069 B2* | 5/2009 | Kawahara et al. | 718/100 |
| 7,533,375 B2* | 5/2009 | Shibayama et al. | 717/159 |
| 2001/0025299 A1* | 9/2001 | Chang et al. | 709/204 |
| 2003/0056199 A1* | 3/2003 | Li et al. | 717/127 |
| 2005/0149937 A1* | 7/2005 | Pilkington | 718/102 |

OTHER PUBLICATIONS

"Explicit Multi-Threading (XMT): A PRAM-On-Chip Vision", www.umiacs.umd.edu/vishkin/XMT (2006).

Frigo et al., "The Implementation of the Cilk-5 Multithreaded Language", MIT Laboratory for Computer Science, pp. 212-223 (1998).

Gottlieb et al., "The NYU Ultracomputer—Designing an MIMD Shared Memory Parallel Computer", IEEE Transactions on Computers, vol. c-32 No. 2, pp. 175-189 (1983).

Naishlos et al., "Towards a First Vertical Prototyping of an Extremely Fine-grained Parallel Programming Approach" (2003).

* cited by examiner

SYSTEM AND METHOD FOR THREAD HANDLING IN MULTITHREADED PARALLEL COMPUTING OF NESTED THREADS

CROSS-REFERENCE TO RELATED APPLICATIONS

This application claims priority to U.S. Patent Application Ser. No. 60/743,146, filed Jan. 19, 2006, which is herein incorporated by reference in its entirety.

GOVERNMENT RIGHTS

This invention was made with Government support under National Science Foundation grant CCF0325393. The Government has certain rights in the invention.

BACKGROUND

The present disclosure relates generally to parallel computing. In particular, the present disclosure relates to thread handling in multithreaded parallel computing of nested threads.

Parallel computing is becoming more widely used as the number of CPU cores provided on a single chip increases. Massively parallel processors (MPPs) provide powerful parallel processing capabilities, however are limited due to their coarse grain parallelism with respect to applications having irregular parallelism. Explicit Multi-Threading (XMT) was developed to provide high performance general-purpose parallel computing using fine grained parallelism, backwards compatibility with existing serial programs, down-scaling of parallelism, superior performance with respect to serial emulations even when the code provides a very limited amount of parallelism, and general scaling of parallelism (see "Explicit Multi-Threading (XMT): A PRAM-On-Chip Vision", described in http://www.umiacs.umd.edu/users/vishkin/xmt/, which is herein incorporated by reference in its entirety. XMT uses a Single Program Multiple Data (SPMD) computer programming language which is capable of executing in serial or parallel modes, providing the computational power of parallel programming and the flexibility to handle varying levels of parallelism. Using SPMD, explicitly defined virtual threads may be executed, or may be derived from parallel or serial programs.

Parallel Random Access Model (PRAM) is a popular abstract shared memory algorithmic model suitable for parallel programming, as described in JaJa, J., "An Introduction to Parallel Algorithms", Addison-Wesley (1992), which is herein incorporated by reference in its entirety. The XMT model is a hybrid of several known models combining features from arbitrary concurrent-read, concurrent-write (CRCW) PRAM (for supporting an arbitrary number of virtual threads), queue-read, queue-write (QRQW) PRAM, as described in Gibbons, P. B., "Efficient Low-Contention Parallel Algorithms", ACM Symposium on Parallel Algorithms and Architectures, 236-247 (1994), and a constant-time limited parallel, variant of fetch-and-add, as described in Gottlieb, A., "The NYU Ultracomputer—Designing an MIMD Shared Memory Parallel Computer", IEEE Trans. Comp., 175-189, February 1983) which are both herein incorporated by reference in their entirety. Ramachandran, V., "Emulations Between QSM, BSP and LogP; A Framework for General-Purpose Parallel Algorithm Design", In Proc. Of 1999 ACM-SIAM Synp. On Discrete Algorithms (1999), which is herein incorporated by reference in its entirety, describes a QSM model used to design and analyze general-purpose parallel algorithms, using algorithms which are adaptations of PRAM algorithms, along with a suitable cost metric.

The SPMD language uses Spawn and Join commands. The Spawn command is involved in facilitating transition from serial mode to parallel mode in which a plurality of parallel threads can operate concurrently. Each thread terminates with a Join command. Once all parallel threads have terminated, transition from parallel mode to serial mode occurs. The XMT architecture is described in the following references, all of which are herein incorporated by reference in their entirety: Naishlos, D., "Towards a First Vertical Prototyping of an Extremely Fine-Grained Parallel Programming approach", TOCS 36, 521-552, (Special Issue of SPAA2001) (2003); Vishkin, U., "Explicit Multi-Threading (XMT) Bridging Models for Instruction Parallelism (extended abstract), Proceedings of the $10^{th}$ ACM Symposium on Parallel Algorithms and Architectures, 140-151, (1998); U.S. Pat. No. 6,542,918, by Vishkin, U., entitled "Prefix Sums and An Application Thereof"; U.S. Pat. No. 6,463,527, by Vishkin, U., entitled "Spawn-Join Instruction Set Architecture For Providing Explicit Multithreading" and its CIP 10/236,934; U.S. Pat. No. 6,768,336, by Vishkin, U., entitled "Circuit Architecture For Reduced-Synchrony On-Chip Interconnect"; and U.S. patent application Ser. No. 11/606,860 "Computer Memory Architecture for Hybrid Serial and Parallel Computing Systems" filed Nov. 29, 2006, claiming priority to U.S. Provisional Patent Application 60/740,255, filed Nov. 29, 2005.

In an XMT machine a thread control unit (TCU) executes an individual thread. A plurality of TCUs may be executing respective threads simultaneously. Upon termination of the virtual thread, e.g., via a JOIN command, the TCU performs a prefix-sum operation in order to receive a new thread ID. The TCU then executes a next virtual thread with the new ID. The plurality of TCUs repeat the process until all of the virtual treads have been completed.

One SPMD model, referred to as the programming model, implements a PRAM-like algorithm and incorporates a prefix-sum statement. The parallel prefix-sum command may be used for implementing efficient and scalable inter-thread synchronization by arbitrating an ordering between the threads.

The SPMD programming model may be extended to support single SPAWN operations in which a thread performs a single SPAWN operation to introduce one new virtual thread as the need arises. Single SPAWN commands from multiple threads may be performed in parallel. The single SPAWN capability allows for programming that is more asynchronous and dynamic than the above programming model.

However, the capability of single Spawn operations is limited to one level of nesting, so that with each single Spawn command each TCU can generate a virtual thread in addition to the thread it executes that is associated with the original SPAWN command.

A need exists for providing an XMT system in which SPAWN commands may be nested within nested SPAWN commands for providing multiple levels of nesting in association with an original SPAWN command for generating multiple virtual threads in association with the original SPAWN command.

A need exists for providing an XMT system which allocates the multiple virtual threads associated with the single SPAWN commands to TCUs.

A need exists to provide an XMT system in which initialization and other data associated with a virtual thread associated with a single SPAWN command is transferred to a TCU executing the virtual thread.

A need exists to provide an XMT system in which the aforementioned allocation of virtual threads and transfer of data associated with the virtual threads is implemented without undo synchronization and repeated wait periods which reduce efficiency.

SUMMARY

The present disclosure is directed to an Explicit Multi-Threading (XMT) system for processing multiple spawned threads associated with an XMT program. The XMT system includes at least one processor, a plurality of thread control units (TCUs) each having an associated ID (TCU-ID) and including at least one series of programmable instructions executable by the at least one processor for executing a plurality of child threads. Each TCU executes a child thread which is allocated to the TCU. Upon completion of execution of the child thread the TCU is available to execute another child thread, and at least one TCU executes a parent child thread of the plurality of child threads that includes a nested spawn-type command for spawning additional child treads of the plurality of child threads. The parent child thread is related in a parent-child relationship a child thread including the nested spawn-type command being a parent thread to the child threads that are spawned in conjunction with the nested spawn-type command. A function module is further provided for assigning a thread ID (TID) to each child thread which is unique with respect to the other TIDs, and allocating the plurality of child threads to respective TCUs of the plurality of TCUs.

The present disclosure is further directed to a method for processing multiple spawned threads associated with SPAWN-type commands of an Explicit Multi-Threading (XMT) program. The method includes executing a plurality of child threads by a plurality of TCUs including a first TCU of the plurality of TCUs executing a child thread which is allocated to it; completing execution of the child thread by the first TCU; announcing that the first TCU is available to execute another child thread; executing by a second TCU a parent child thread of the plurality of child threads that includes a nested spawn-type command for spawning additional child threads of the plurality of child threads, wherein the parent child thread is related in a parent-child relationship to the child threads that are spawned in conjunction with the nested spawn-type command; assigning a thread ID (TID) to each child thread of the plurality of child threads which is unique with respect to the other TIDs; and allocating a new child thread to the first TCU.

The present disclosure is still further directed to a method for processing multiple spawned threads associated with SPAWN-type commands of an Explicit Multi-Threading (XMT) program. The method includes executing a plurality of child threads by a plurality of TCUs including a first TCU of the plurality of TCUs executing a child thread which is allocated to it; completing execution of the child thread by the first TCU; and announcing that the first TCU is available to execute another child thread; executing by a second TCU a parent child thread of the plurality of child threads that includes a nested spawn-type command for spawning additional child threads of the plurality of child threads.

The parent child thread is related in a parent-child relationship to the child threads that are spawned in conjunction with the nested spawn-type command. The method further includes assigning a thread ID (TID) to each child thread of the plurality of child threads which is unique with respect to the other TIDs; allocating a new child thread to the first TCU; writing by the second TCU the initialization data into the designated location; reading by the first TCU initialization data for execution of the new child thread from a location designated for storing the initialization data of the new child thread; and waiting by the first TCU for the initialization data to be successfully written into the designated location before reading the initialization data if the ZO initialization data is not yet written into the designated location. The designated location is referenced using the TID of the new child thread.

Other features of the presently disclosed XMT system will become apparent from the following detailed description, taken in conjunction with the accompanying drawings, which illustrate, by way of example, the presently disclosed XMT system.

BRIEF DESCRIPTION OF THE DRAWINGS

Various embodiments of the present disclosure will be described below with reference to the figures, wherein.

DETAILED DESCRIPTION

A system and method is provided for supporting Explicit Multi-Threading (XMT). In the current example the XMT capability is supported by using single program multiple data (SPMD) processing Virtual threads are executed in parallel, including transitioning from parallel to serial processing, and vice versa using SPAWN and JOIN commands. A virtual thread itself may include one or more nested Spawn commands known as single SPAWN or k-SPAWN instructions, which are referred to below, collectively, as nested SPAWN-type commands. Furthermore, any thread created by such a nested SPAWN-type command may further include a nested SPAWN-type command, thus creating one or more nested levels.

During execution of an SPMD program, when encountering a SPAWN command, the set of instructions, referred to as a parallel segment, which are positioned between the SPAWN command and a JOIN command, are retrieved, inclusive with the SPAWN and JOIN commands. The number of threads to be generated from the SPAWN command are specified by an attribute of the SPAWN command. A thread that includes a nested SPAWN-type command is called a parent thread. It may also be referred to as a parent child thread when it is the child of another thread. A thread generated as the result of execution of the nested SPAWN-type command is called a child thread, where the child thread is a child of the parent thread.

A plurality of physical units, known as thread control units (TCUs), are provided for executing the plurality of threads in parallel. The number of threads that can be processed at any given time is limited by the number of TCUs available. Once a TCU completes execution of a thread, it begins to execute another thread, until all of the threads have been executed. The maximum number of threads that can be executed at the same time is limited by the number of TCUs provided. At a given moment, the term "virtual" thread refers to all of the threads already spawned as a result of the initial Spawn command and any nested SPAWN-type commands encountered. The term "physical" thread refers to the threads that are actually executed in hardware at a given moment. Since all of the threads are virtual at some point in time, all spawned threads may be referred to as virtual in the description below.

Nested SPAWN-type commands include s-SPAWN commands and k-SPAWN commands. Each time that an s-SPAWN command is executed, one virtual thread is generated, and each time that a k-SPAWN command is executed, k virtual threads are generated. An s-SPAWN command is a special instance of a k-SPAWN command in which k=1.

The maximum number of virtual threads generated at any given time varies as nested threads are generated and terminated by the executing TCUs. Management of the child threads includes providing each child thread with three IDs: (i) a natural (or virtual) ID, (ii) a physical ID, and (iii) an assigned thread ID (TID). Another ID, called place-holder ID, is also used as a temporary ID. The natural ID is the number that corresponds to how the SPMD program refers to the child thread. The physical ID is the ID of the TCU that is assigned to execute the child thread. Each thread is provided with a TID that is unique relative to the TIDs of all of the other threads generated with relation to the current parallel segment. The TID is provided in the current example by performance of a prefix-sum (ps) operation.

Referring now to the drawing figures, in which like references numerals identify identical or corresponding elements, an XMT system and method in accordance with the present disclosure will now be described in detail. With initial reference to FIG. 1, an exemplary XMT system in accordance with the present disclosure is illustrated and is designated generally as XMT system 100. XMT system 100 includes a plurality of thread control unit (TCU) clusters 102, a master TCU (MTCU) 104, a memory pool 106 and a function module 108. The memory pool 106 includes a plurality of memory modules 110, e.g., implemented as RAM, each module including at least one level of shared cache, shown in the present example as a first level shared cache 112 and a second level shared cache 114. A designated area 116 is further provided with each memory module 110 in which initialization data or pointers thereto for child threads is stored. Preferably, the XMT system is all provided on one chip. Additional off-chip memory may be available for use by the TCUs or the MCTU 104, as described further below. The XMT system 100 in the present example implements SPMD programming.

Figure 1:
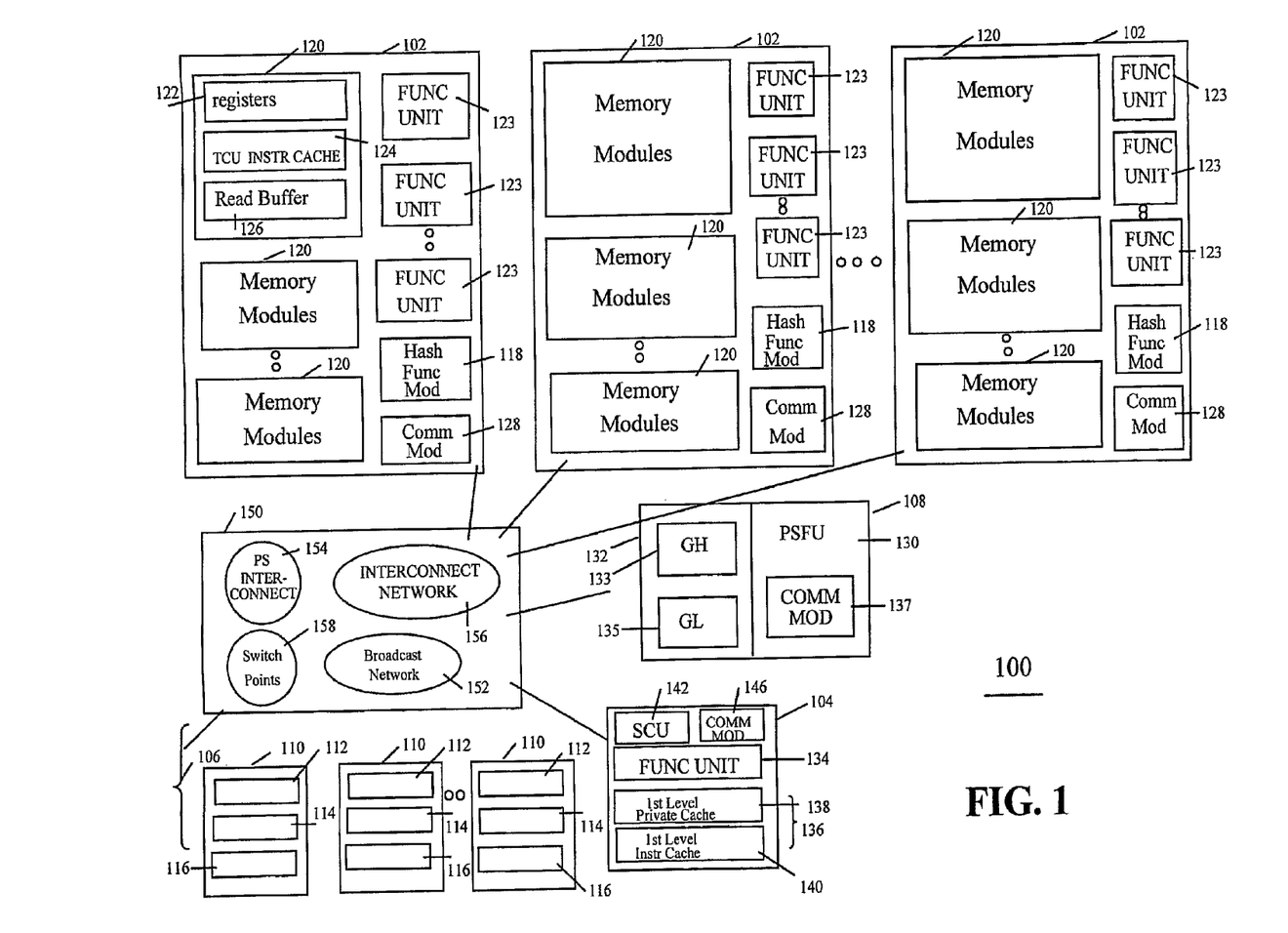
FIG. 1 is a block diagram of an exemplary XMT system in accordance with the present disclosure.

Each TCU cluster 102 includes a set of two or more TCUs that are grouped together to increase resource utilization and to hide latencies. Each TCU has an associated ID, TCU-ID. The TCUs in a cluster share a hash function module 118, a common pool of memory modules 120, and a common pool of function units 123; The hash function module 118 may implemented as a hardware unit. It is also contemplated that the hash function module be implemented as a software module, such as executed by the function units of the common pool 123. Each memory module 120 includes register file 122 having at least one local register, a TCU instruction cache 124, and at least one read buffer 126.

The function module 108 includes a prefix-sum functional hardware unit (PSFU) 130 and global register 132. The global register 132 includes a GR-HIGH register 133 and GR-LOW register 135 in addition to a plurality of general PS base registers (in this example, at least six) used for general prefix-sum operations, described further below. The PSFU 130 includes a communication module 137 for providing the capability to transmit and receive broadcasts. The MTCU 104 includes at least one functional unit 134, a local memory 136, including a first level private cache 138 and a first level instruction cache 140. The MTCU 104 further includes a spawn control unit (SCU) 142.

Communication between the plurality of TCUs, the MTCU 104, the memory pool 106 and the functional module 108 is provided via at least one communication group 150, which includes an interconnection network 152, a dedicated hardware prefix-sum interconnect 154 and a broadcast network 156. The communication group 150 may have other configurations, such as including a communication bus, one or more communication lines providing a direct coupling between two or more elements, or the equivalent. The communication devices 150 may be configured for wired or wireless communication. Communication between TCUs or TCU clusters 102 is through prefix-sum computation, and may further be exclusively through prefix-sum computation. The interconnection network 152 includes communication devices, such as networking devices, that may be wired or wireless, for providing access by the TCU clusters 102 and the MTCU 104 to the memory pool 106.

The prefix-sum interconnect 154 includes at least one communication device that may be wired or wireless for provides communication between the TCU clusters 102 and the function module 108. The PSFU 130 of the function module 108 provides communication between the TCUs of the clusters of TCUs 102. The broadcast network 156 includes at least one ZO communication device, that may be wired or wireless, for providing broadcast capabilities for transmission of broadcasts between the MTCU 104, TCUs of the clusters of TCUs 102, and PSFU 130. The interconnect network 152 and the broadcast network 156 may share devices. Furthermore, the PSFU 130, MTCU 104 and the TCU clusters 102 may be provided with communication modules 137, 146 and 128, respectively, which include the hardware and/or software modules for facilitating communication via the interconnection network 152, the prefix-sum interconnect 154, and/or the broadcast network 156.

Components of XMT system 100, including functional unit 123, PSFU 130, functional unit 134, SCU 142, communication modules 118, 146 and 147, and hash function module 118 may include hardware communication and/or processing devices and/or software modules. Processing devices may be shared by software modules of different components. The software modules each include a series of programmable instructions capable of being executed by the associated processing device(s). The series of programmable instructions can be stored on a computer-readable medium, such as RAM, a hard drive, CD, smart card, 3.5" diskette, etc., or transmitted via propagated signals for being executed by the associated processing device for performing the functions disclosed herein and to achieve a technical effect in accordance with the disclosure. The functions of the respective software modules may be combined into one module or distributed among a different combination of modules. Furthermore, it is contemplated that the MTCU 104 and the function module 108 may share selected, or all, hardware components, software modules and/or functionality.

The MTCU 104 accesses an instruction memory (not shown) and executes the instructions. An XMT program stored in the instruction memory is stepped through via a program counter, and the respective instructions pointed at by the program counter are executed by the MTCU 104 by operating in a serial mode until the MTCU 104 encounters a SPAWN command. When operating in the serial mode the MTCU 104 uses its local functional unit 134, first level private cache 138 and first level instruction cache 140 to store and process the XMT program instructions.

The disclosure is not limited to the exemplary architecture shown in FIG. 1. In other contemplated configurations, for example, the TCUs may each have their own dedicated resources (e.g., function unit, registers, instruction memory, buffers, etc.) as opposed to being clustered and sharing resources as shown and described. The scheduling of the memory resources may be centralized or decentralized. The TCUs and MTCU 104 may use dedicated data memory or shared data memory.

The exemplary memory configuration shown may be particularly efficient and advantageous for an XMT system 100 having large amounts of on-chip RAM capable of holding large working sets, including taking advantage of the large bandwidth available for connectivity within a chip.

In the exemplary architecture shown, a plurality of small cache modules 124 are provided for the TCUs that can be accessed simultaneously, allowing for sufficient bandwidth to satisfy the execution of many threads at one time. The memory address space is partitioned among the memory modules 110. A single, fixed physical location is specified for each address, eliminating the need to keep address values coherent between different memory modules. The hash function module 118 performs randomized hashing for minimizing collisions among accesses from various threads and distributing addresses among the memory modules 110. The data is distributed at the granularity of blocks for exploiting spatial locality within a block. The memory configuration described here enables efficient implementation of PRAM, in which many accesses to a shared memory seem be satisfied within the same time as a single access.

Effective use of off-chip memory is provided by extending the address partitioning to independent memory modules that serve the on-chip caches. Multiple outstanding external requests are supported for effectively utilizing off-chip bandwidth, even for non-streaming types of applications. An adder is incorporated into each memory module 110, having serial access within the respective module, for supporting multiple simultaneous prefix-sum-to-memory (psm) operations. Support of many simultaneous accesses to a single register is implemented using the PFSU 130.

The configuration of memory pool 106 allows for TCU memory requests to travel to any memory location on the chip. The independence of order characteristic of XMT threading allows for any latency to be tolerated. When many threads are executed simultaneously and large amounts of memory requests are propagating through the network, execution resources continue to process their respective threads. The interconnection network 156 of the communication devices 150 supports pipelining, and thus provides the ability to handle many simultaneous requests.

The interconnection network 156, a global resource of the XMT system 100, uses a decentralized routing scheme. The routing scheme may use, for example, the basic topology of a crossbar, with routing at each destination performed locally by a "tee of gatekeepers" having a gatekeepers structure which mimics a multiplexer tree of a synchronous crossbar, but allows requests to proceed locally as they are able, rather than using a global schedule. This tree of gatekeepers is formed from locally synchronous switch points 158 that select from two inputs, depending on which arrives first, thus providing an asynchronous or loosely synchronous structure.

Accordingly, the TCU instruction caches 124 efficiently support the predictable locality patterns characteristic of TCU's instruction fetching. The TCU instruction caches 124 receive instructions via the shared low-bandwidth broadcast interconnect 152 via instructions broadcast by the MTCU 104 to the TCUs. The TCUs are clustered such that each cluster has a static size that is small enough for effective local caching. Arbitrary instructions are still fetched through the memory pool 106, albeit less efficiently than via broadcasting.

Upon encountering a SPAWN command, the MTCU 104 retrieves the parallel segment positioned between the SPAWN command and a JOIN command, inclusive. The SCU 142 of the MTCU 104 initiates spawning of the parallel segment into a plurality of child threads, wherein the number of child threads is specified by a parameter of the SPAWN command. The MTCU 104 broadcasts via the communication module 146 and broadcast network 152, spawn information to the PSFU 130 and the TCUs. The spawn information includes initialization values for GR-HIGH 133 and GR-LOW 135 (GR-LOW may be a default value), the parallel segment, and the number of virtual threads. The TCU's store the parallel segment locally in the local TCU instruction cache 124.

The PSFU 130 allocates the virtual threads spawned from the SPAWN command to the TCUs, and the individual TCUs execute their respective threads concurrently and asynchronously with respect to one another. Upon completion of execution of a virtual thread the individual TCUs notify the PSFU 130. A first TCU recognizes the termination of a virtual thread when it encounters a JOIN command of the parallel segment. Upon notification from a TCU that it has completed execution of a child thread, the PSFU executes a prefix-sum operation in which the base is GR_LOW, the increment is one, and the value returned is a TID. The TID is assigned the initial value of OR-LOW at the time the prefix-sum operation and GR-LOW is incremented by one.

When the first TCU receives a returned TID from the PSFU 130 it compares the TID to GR-HIGH. If the TID is greater than OR-HIGH there are no child threads available to be executed, and the first TCU goes to a sleep state or an idle state. If the TID is less than OR-HIGH then there is at least one child thread waiting to be executed, and the TID determines which of the waiting child threads is allocated to the TCU. The allocation is completed when valid initialization data is stored in a location referenced by the TID which the first TCU uses for executing the allocated child thread. The initialization data for child threads spawned from the original SPAWN command is stored before the child threads are executed. However, this is not the case for all child threads, as described further below. The respective TCUs continue to execute virtual threads associated with the SPAWN command until all of the virtual threads have been executed, at which point all of the TCUs will be in a sleep state. The MTCU 104 monitors when all of the TCUs are in a sleep state, at which point it returns to serial mode.

A second TCU may encounter a nested SPAWN-type command as it is executing a thread upon which the TCU notifies the PSFU 130. Upon notification from the second TCU that it has encountered a nested SPAWN-type command, the PSFU executes a prefix-sum operation for each child thread being spawned in which the base is OR HIGH, the increment is one, and the value returned is a TID. Each TID is assigned the initial value of GR-HIGH at the time that the prefix-sum is executed and GR-HIGH is incremented by one. The PSFU 130 broadcasts the adjusted value of GR-HIGH. Furthermore, the second TCU uses the assigned TIDs to store initialization data associated with each of the spawned child threads, where the TIDs are used for determining the location in which the initialization data is stored.

The first TCU that is in an idle state continually compares the TID that it is using to the broadcast value for GR-HIGH. When the TID it is using is less than OR-HIGH the first TCU will use the TID to access initialization associated with the TID, where the TID is used for determining the location that it checks for initialization data. Once the initialization has been stored by the second TCU, the child thread having the TID is allocated and executed by the first TCU. The first and second TCUs do not know the identity of one another. Furthermore, the receipt of the TID by the first and second TCUs could occur in either order. Additionally, the storing the initialization data associated by the TID by the second TCU and reading or attempting to read the initialization data by the first TID could occur in either order.

While TCUs that are executing unrelated threads (the relation being a parent thread and a child tread spawned from the parent thread) operate substantially asynchronously with respect to one another, the first and second TCUs that are executing related threads are synchronized sufficiently for the first and second TCU to be using the same TID, and for the first TCU to have access to the initialization data provided by the second TCU. Two methods, a spin-wait solution and a sleep-wait solution, are described below for storing and accessing the initialization data, and providing synchronization between the first and second TCUs.

As threads are spawned and joined the global registers GR-LOW 135 and/or GR-HIGH 133 are adjusted to reflect the range of valid IDs that can be assigned to virtual threads as the virtual threads are allocated to respective TCUs in order to be executed. For example, when a nested SPAWN-type command is encountered, the value of GR-HIGH 133 is incremented, and as the threads are actually executed, the value of GR-LOW is incremented. The value of GR-LOW indicates the number of threads that are currently executing, and the value of GR-HIGH indicates the number of threads that are waiting to be executed. The values for GR-HIGH 133 and GR-LOW 135 may be reinitialized when the MTCU 104 returns to a serial mode from a parallel mode. Each time that OR-HIGH 133 is changed, the new value is announced or broadcast to the TCUs. Furthermore, the TCUs may actively access the values for GR-LOW and GR-HIGH when the need arises. The TCUs store the current value of GR-HIGH 133 locally.

In some instances the value for a thread's assigned TID may exceed the current value of GR-HIGH, and the TCU assigned to execute that thread cannot execute the thread until OR-HIGH is incremented to a value that is greater than the TID, upon which the TID becomes valid. Accordingly, the TCU compares the locally stored GR-HIGH 133 to the assigned TID of a virtual thread of interest to determine when the assigned TID becomes valid.

Each time that a TCU terminates execution of a virtual thread, or one or more new virtual threads are generated by a nested SPAWN-type command, the PSFU 130 performs a prefix-sum operation in order to generate an appropriate number of new TIDs which are assigned to the respective virtual threads or begin allocating the spawned threads to respective TCUs. The TCUs do not need to communicate with one another other hand by using the prefix-sum computations. Because each prefix-sum is atomic, each virtual thread will be assigned a unique assigned ID, e.g., receive a different return value. This way, the parallel prefix-sum command can be used for implementing efficient and scalable inter-thread synchronization, by arbitrating an ordering between the virtual threads.

The prefix-sum implementation used by the XMT system 100 gives the XMT system 100 a characteristic of independence of order semantics (IOS), in which a TCU that is processing a thread does not have to busy-wait for another unrelated thread (a related thread being a parent or child thread, which cases are discussed further below). Busy-waiting, in which a processor waits on an event by spinning through a tight or timed-delay loop that polls for the event on each pass, is often considered to be inefficient and wasteful. U.S. Pat. No. 6,542,918, entitled "Prefix Sums and an Application Thereof", by Uzi Vishkin, filed on Apr. 1, 2003, describes a system and method for performing prefix-sum operations, and is herein incorporated by reference in its entirety.

The prefix-sum operates on a base variable, B, and an increment variable, R. The result of a prefix-sum (similar to an atomic fetch-and-increment) is that B gets the value B+R, while the return value is the initial value of B before the increment. U.S. Pat. No. 6,542,918 shows how to implement efficiently parallel prefix sum commands with respect to the same base, B, but only if none of the increments, R, exceed a "small non-negative" integer. A PSFU having N single-bit inputs is very similar to an N-bit integer adder. However, while a prefix-sum command could be used to allocate assigned thread TIDs to the new threads to form a successive interval of indices, a problem arises when the number of threads spawned by some threads exceeds the limit on "small non-negative integers".

When a nested SPAWN-type command is encountered by a TCU, the PSFU 130 increments the value of GR-HIGH 133 using a prefix-sum instruction. When the nested SPAWN-type command is an s-SPAWN command, GR-HIGH 133 is incremented by one, and when the nested SPAWN-type command is a k-SPAWN command, GR-HIGH is incremented by k. Multiple threads can each concurrently initiate execution of a k-SPAWN command, each generating multiple new threads. When the integer k is a power of 2 the hardware implementation is simplified, where the limitation of applying the prefix-sum command only to small non-negative integers is addressed by applying k just to the proper bit. For example if k=2^i, for a non-negative integer i, then the prefix-sum command applies k to bit i+1, where bit 1 is the least significant bit.

Figure 2:
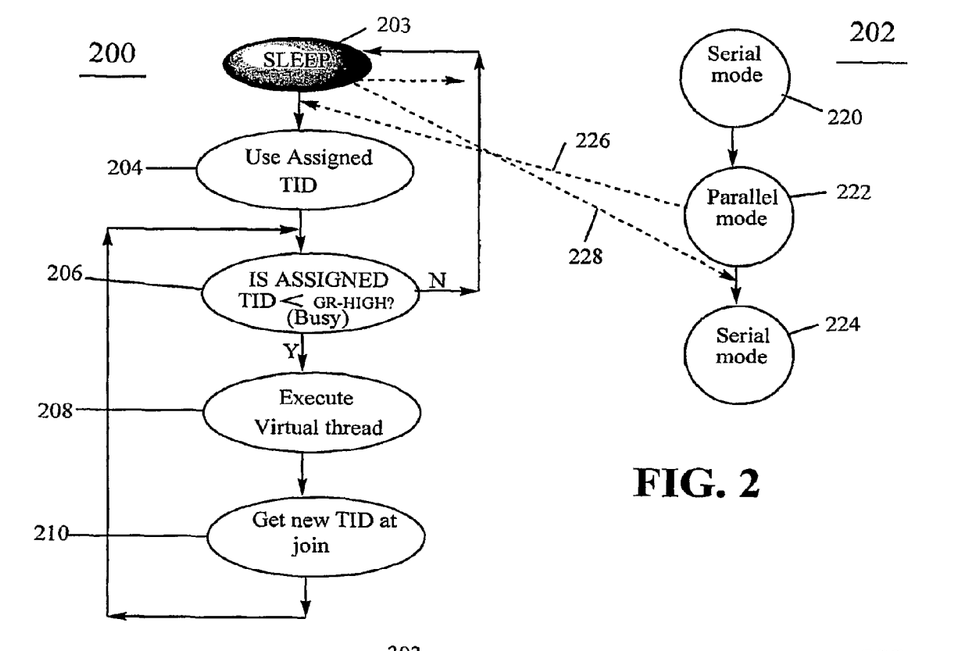
FIG. 2 is a flow chart and state diagram showing exemplary processing steps and states of a thread control unit (TCU) and master TCU (MTCU) of the XMT system shown in FIG. 1 without nested spawning.

FIG. 2 shows a flowchart 200 of steps executed by an exemplary TCU i and its states, and a corresponding state diagram 202 showing states of the MTCU 104 when the TCU i is executing a tread that does not have any nested SPAWN commands. At step 203, the TCU i is in a sleep state. The MTCU 104 is shown operating in serial mode in state 220 after which it transitions to operating in parallel mode in state 222, e.g., after encountering a SPAWN command.

The MTCU 104 transmits a broadcast, including the parallel segment and initialization values for OR-LOW 135 and GR-HIGH 133, after which the MTCU 104 waits for completion of the parallel execution of the virtual threads by the TCUs. The TCU clusters 102, including the exemplary TCU i, are activated by the notification of the arrival of the new threads (e.g., by the broadcast) as indicated by dotted line 226, causing the TCU i to exit the sleep state and save the information that was provided by the broadcast, including the parallel segment, in its local instruction cache 124. The PFSU 130 processes the broadcast transmitted by the MTCU 104 by performing prefix-sum operations and transmitting broadcasts of updated GR-HIGH values.

Instead of a broadcast, the MTCU 104 may store the SPAWN command in a designated location of the memory pool 106, and the TCUs may actively check if a SPAWN instruction has been stored in the designated location and fetch the instruction once found, however in most applications the use of broadcasts is more efficient. In general, when the present description refers to a broadcast, one skilled in the art will understand that other methods for passing information may be used.

At step 204, TCU 1 notifies the PSFU 130 that it is available to execute a thread and receives a unique assigned TID in return from the PSFU 130. At step 206, TCU i checks if the TID is less than GR-HIGH 133. If yes, at step 208, TCU i executes the instructions of the virtual thread (e.g., the parallel segment). At step 210, TCU i gets a new assigned TID after reaching the JOIN command to associate with a next virtual tread. Execution then returns to step 206 to compare the assigned TID with OR-HIGH 133 before executing the next virtual thread.

When at step 206 it is determined that the assigned TID is higher than GR-HIGH 133, indicating that the most recently assigned TID is beyond the scope of the present SPAWN command, TCU i returns to the sleep state at step 203 in which it will remain until awoken by the MTCU 104. The MTCU 104 detects when TCU i enters the sleep state, as indicated by dotted line 228, and if all of the other TCUs are in the sleep state as well, the MTCU 104 enters the serial mode again at step 224.

Figure 3:
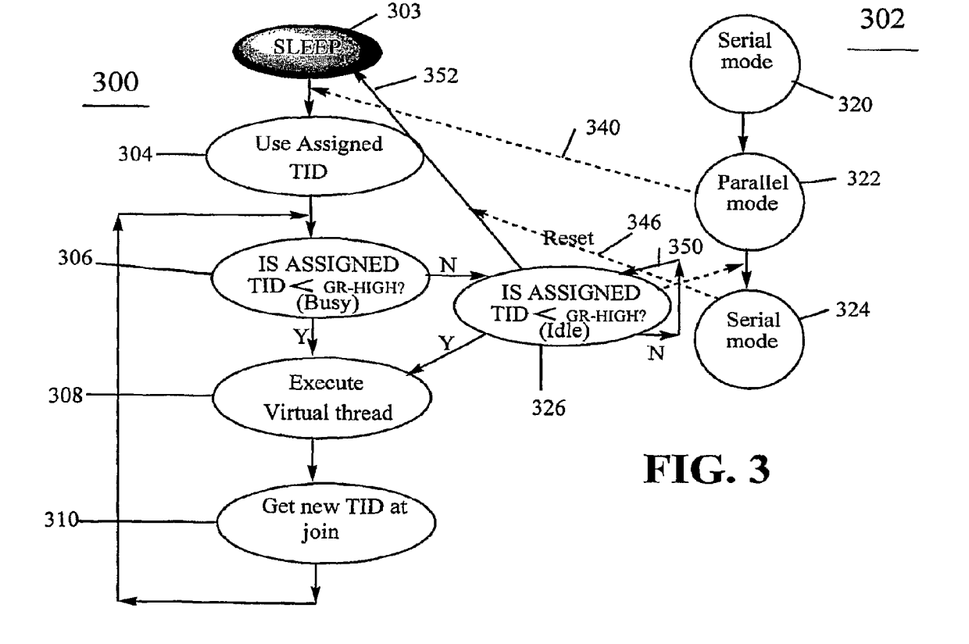
FIG. 3 is a flow chart and state diagram showing exemplary processing steps and states of a TCU and MTCU of the XMT system shown in FIG. 1 with nested spawning.

FIG. 3 illustrates states of a finite state machine, including a flowchart 300 of steps executed by an exemplary TCU i and a corresponding state diagram 302 showing states of the MTCU 104 when the TCU i is executing a thread that may have a nested SPAWN command. At step 303, the TCU i is in a sleep state. The MTCU 104 is shown operating in serial mode in state 320 after which it transitions to operating in parallel mode in state 322, e.g., after encountering a SPAWN command.

The MTCU 104 transmits a broadcast, including the parallel segment and initialization values for OR-LOW 135 and GR-HIGH 133, after which the MTCU 104 waits for completion of the parallel execution of the virtual threads by the TCUs. The TCU clusters 102, including the exemplary TCU i, are activated by the notification of the arrival of the new threads (e.g., by the broadcast) as indicated by dotted line 340, causing the TCU i to exit the sleep state and save the broadcasted information, including the parallel segment, in its local instruction cache 124.

In the first iteration of the steps of flowchart 300 the natural ID is a unique ID, and there is not a need to assign a unique TID to the virtual thread. In the present example, the natural ID for the virtual thread executed by TCU i is i. When the number of virtual threads spawned exceeds the number of TCUs, at least some of the TCUs will execute multiple iterations of the steps of flowchart 300 for executing an additional at least one more virtual thread. Each virtual thread is assigned a unique TID.

At step 304, TCU i notifies the PSFU 130 that it is available to execute a thread and receives a unique assigned TID in return from the PSFU 130. At step 306, TCU i checks if the TID is less than GR-HIGH 133. If yes, at step 308, TCU i executes the instructions of the virtual thread (e.g., the parallel segment). At step 310, TCU i gets a new assigned TID after reaching the JOIN command to associate with a next virtual thread. Execution then returns to step 306 to compare the assigned TID with OR-HIGH 133 before executing the next virtual thread.

When at step 306 it is determined that the assigned TID is higher than GR-HIGH 133, indicating that there are no child threads waiting to be executed at the moment, TCU i, TCU i enters an idle state at step 326. When TCU i enters the idle state it continues to compare the assigned TID with GR-HIGH 133, as indicated by solid line 350. Each time that an adjustment to GR-HIGH 133 is broadcast, the TCU compares the updated value for GR-HIGH 133 to the assigned TID. If the assigned TID becomes valid, such as due to an increase in GR-HIGH 133, TCU i executes step 308 for executing the virtual thread. Execution of the virtual thread includes TCU i checking if initialization data has been stored in a location that is associated with the TID of the virtual thread which the TCU i can access. If the initialization data is not yet accessible to TCU i, then TCU i waits until the initialization data is accessible. The waiting may be performed using the exemplary spin-wait or sleep-wait solutions described further below.

The MTCU 104 detects when all of the TCUs have entered the idle state 326, which signals that execution of the current parallel section has been completed, and the MTCU changes back to serial mode 324, as indicated by dotted line 342. Once the MCTU 104 enters the serial mode at step 324 it resets all of the TCUs, as indicated by dotted line 346, for signaling the TCUs to enter the sleep state at step 303. The state change from state 326 to state 303 is shown by solid 352.

As mentioned above, the IOS characteristic of XMT system 100 eliminates the need for a TCU that is processing a virtual thread to busy-wait for another unrelated thread. IOS further reduces the need for a TCU to wait when implementing SPAWN-type commands, such as during synchronization between a parent thread and a child thread. In the present embodiment, processing the parent thread includes storing initialization data for the child thread, and declaring the child thread to be ready for execution by a TCU when a SPAWN-type command is encountered.

Processing of the child thread includes reading the initialization data, which of course cannot be done until the initialization data has been stored by the parent thread. However, the assigned TID is required to proceed with processing of the child thread, as the assigned TID is the basis upon which virtual threads are distinguished during SPMD processing. Thus, the natural ID and other initialization data associated with the child thread (or a pointer to such data) is stored after an assigned TID has been provided by the PSFU 130 for correlating the natural ID with the assigned TID.

It follows that processing of the child thread may include some waiting based on the processing of the parent thread, thus requiring synchronization. In the spin-wait solution, execution of the child thread is suspended until the initialization data is provided by the TCU executing the parent thread. When waiting, the TCU executing the child thread continues to check if the data has been provided.

Another exemplary solution includes providing a designated area 116 in memory pool 106 dedicated to storing initialization data for virtual treads. Designated area 116 includes an array L which store the initialization data for respective virtual threads, where element or location L(i) stores initialization data for a virtual thread having an assigned TID i, also referred to as virtual thread i. Each element in array L has an associated Value field for storing the initialization data or one or more pointers to the initialization data (as the initialization data may be stored in one or more locations within memory pool 106 or even in another area of memory that is not shown; TCU-ID field for storing the TCU-ID of the TCU executing the child thread; and Status field storing the status of L(i). The address of L(i) is determined in accordance with the assigned TID i of the virtual thread i. A location L(i) is allocated for each child thread. Furthermore, the locations L each function as a state machine having control logic for updating and tracking the Status field and reading out data stored in the Value field to the TCU having the TCU-ID stored in the TCU-ID field once valid data is written into the Value field.

Execution of the parent thread includes writing the initialization data for each of its child threads, where the initialization data for child thread i is written into the Value field of L(i). In the present example, this occurs with exactly one write operation. Furthermore, in the present example, the execution of the parent thread is the only occasion for writing into L(i) during the current SPAWN operation. The TCU executing the child thread i reads the initialization data from L(i). The read operation further entails writing the TCU-ID of the TCU executing the child thread i into the TCU-ID field of L(i). In the present example, this occurs with exactly one read operation. Furthermore, in the present example, the one read operation by the TCU executing the child thread i is the only occasion for reading from L(i) for the current SPAWN operation. The locations L are treated as special locations, and the status of each location L is stored in the Status field of that location L.

The status of a location L describes the state that L is currently in. The possible states of L are (a) L has not been read or written into; (b) L has already been written into, but not yet read; (c) an attempt to read L was made, but L has not yet been written into; and (d) L has been written into and read from.

Figure 4:
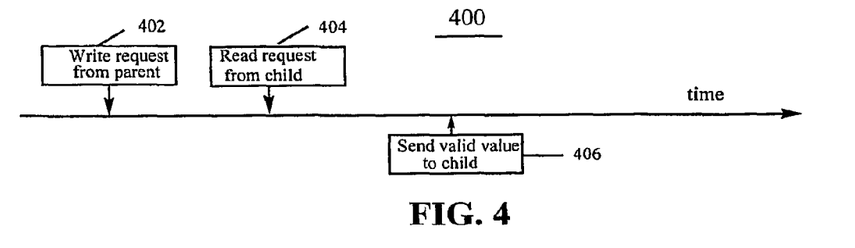
FIG. 4 is a time line showing exemplary timing of thread processing when a write request from a parent occurs before a read request from a child.
Figure 5:
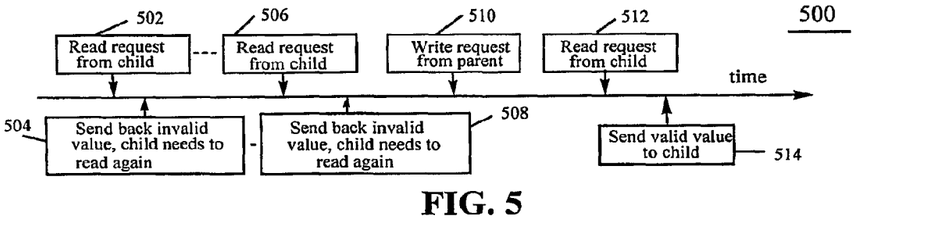
FIG. 5 is a time line showing exemplary timing of thread processing when a read request from a child occurs before a write request from a parent using a spin-wait solution.
Figure 6:
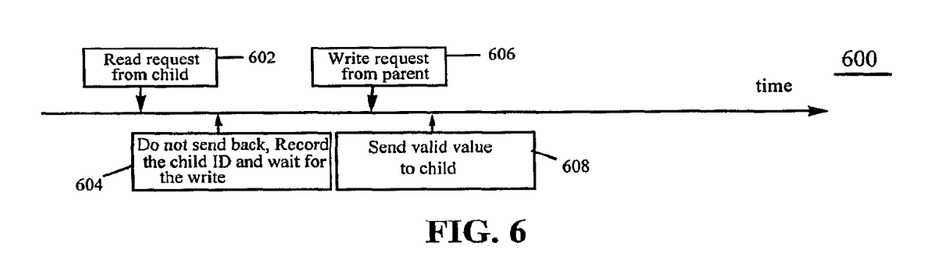
FIG. 6 is a time line showing exemplary timing of thread processing when a read request from a child occurs before a write request from a parent using a sleep-wait solution.
Figure 7:
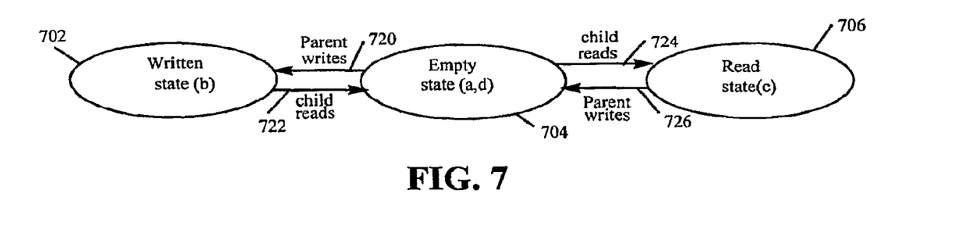
FIG. 7 is an exemplary state transition diagram for the sleep-wait solution illustrated in FIG. 6.

FIGS. 4-6 illustrate a variety of situations and solutions related to synchronization of execution of a related child thread and parent thread, and FIG. 7 illustrates state transitions of L(i) when using the solution illustrated in FIG. 6. With reference to FIG. 4, at event 402, a write request is generated by the TCU executing the parent thread, and L(i) is written into with initialization data for the child thread i. At event 404, a read request to read from L(i) is generated by the TCU executing the child thread i. In this situation there is no need for the TCU executing the child thread i to wait for the read request to be processed. At event 406, the read request is processed by reading from L(i), by which valid initialization data for the child thread i is read by the TCU executing the child thread i.

In FIG. 5, at event 502, the TCU executing the child thread i generates a read request before the requested data has been written by the TCU executing the parent thread. The reading TCU and the writing TCU read and write, respectively, from a programmer defined location in memory pool 106, such as in the first or second level shared caches 112 and 114, where the address of the location is based on the assigned ID of the child virtual thread. At event 504, an invalid value (e.g., a junk value, such as a negative number) is returned to the TCU executing the child thread i in response to the read request, indicating that the TCU executing the child thread i needs to generate another read request.

At event 506, the TCU executing the child thread i generates another read request. At event 508, again, an invalid value is returned to the TCU executing the child thread i in response to the read request, indicating that the TCU executing the child thread i needs to generate another read request. At event 510, a write request is generated by the TCU executing the parent thread for writing valid initialization data for the child thread i into the programmer predefined location in main memory. At event 512, the TCU executing the child thread i generates another read request. At event 514, valid initialization data for the child thread i is returned to the TCU executing the child thread i in response to the read request. This solution is a spin-wait solution.

With reference to FIG. 6, at event 602, a read request to read L(z) is generated by the TCU executing the child thread i. The read request carries the unique assigned ID of the child thread i. At event 604, the child thread i's assigned TID is stored in location L(i). The TCU executing the child thread i does not receive a response to the read request and waits for L(i) to be written into. At event 606, a write request for writing the child thread i's initialization data into L(i) is generated by the TCU executing the parent thread. At event 608, in response to the read request, valid initialization data for the child thread i is returned to the TCU executing the child thread i. This solution is a sleep-wait solution which is more efficient in terms of shared processing resources (e.g., the interconnection network 152) and time consumption than the above spin-wait solution.

With reference to FIG. 7, if a read request is generated for reading from L(i) while L(i) is in an empty state, state (a), a transition to a read state, state (c), is made, shown by arrow 724, and the ID of the requesting TCU is stored in the TCU-ID field of L(i). If a write request by the TCU executing the parent thread is generated for writing into L(i) while L(i) is in state (a), a transition to state (b) occurs, shown by arrow 720, and the write request content is stored in L(i), and the initialization data for the child thread i is written into the Value field of L(i). If a read request is generated for reading from L(i) while L(i) is in state (b), the read request is processed as a normal read request by reading out and returning the content stored in L(i) to the requesting TCU and L(i) transitions to state (d), as shown by arrow 722.

Once the data content of L(i) is read out, the data need not be preserved in location L(i), as the data read does not need to be read again from L(i). Therefore, if a write request for writing into L(i) is generated while L(i) is in state (c), the data content of the write request (e.g., the initialization data for child thread i) is sent to the TCU that previously requested the data via a previous read request, and L(i) transitions to state (d). The data content of L(i) while at state (d) should be the same regardless of whether the transition to (d) occurred from state (b) or state (c). It may be advantageous to collapse states (a) and (d) into one state, as shown in FIG. 7, in case location L(i) is reused for a similar purpose at a later stage of the computation, e.g., for another child thread/parent thread combination during a subsequent SPAWN operation.

The assigned TID, which is generated using an integer interval via the prefix-sum operation, may be used for allocating and referencing working memory areas from memory pool 106, e.g., designated area 116. For example, the integer interval may be used by the compiler or operating system of the XMT system for allocating space and referencing the working memory area. A task file array may be provided in which are stored initialization data for each of the child threads, where the array is indexed using the TID. Input data is provided for storing data to be operated on by the child threads. However, each thread may be operating on different data. The initialization data describes what portion of the data is to be operated upon for the child threads. An array storing the initialization data and/or the data to be operated on may be indexed using the TID or a function thereof. In other words, the working memory associated with a child thread may be treated as a one-dimensional array, with the TID providing an offset from the starting location of the working memory.

A first program is shown below in TABLE 1, as an example of implementation of a nested s-SPAWN command using the spin-wait solution. The first program is a portion of a parallel segment of an SPMD program, and represents a portion of a child thread spawned by way of a SPAWN statement currently executing on a TCU. The beginning commands, including the SPAWN command, and the ending commands, including the JOIN command, of the originally spawned thread are not shown. The first program is written in pseudo-code in which quick-sort, a well-known method for sorting, is used to sort an input array of data. The quick-sort algorithm is a randomized algorithm that applies the following two steps recursively: (i) given the input array, select a random element p from the array as a 'pivot', and then (ii) partition the input array into two arrays: a left array including elements who's value is less than the value of pivot position p, and a right array including elements who's value is greater than or equal to the value of pivot position p. After the thread finishes the partitioning, a new child thread is spawned by an s-SPAWN command to sort the right array, while the original thread proceeds with sorting the left array.

Locations in relay_array which are needed by child threads generated from an original SPAWN command are initialized with valid data prior to execution of the child threads, while other locations within relay_array, including relay_array[$], which are to be used subsequently by child threads generated by nested SPAWN-type commands, are initialized to invalid values. In the present example, the invalid values are negative numbers.

Notation "//", such as used in command 2, denotes comments. Commands 3-5 are repeatedly executed (which is described as "spinning"), until a non-negative value is read from relay_array[$]. The non-negative valid data is entered into the relay_array[$] by the TCU executing the parent thread of $, which is performed in command 15 of the parent thread of $. Start and end values for the current thread operating are read in commands 6 and 7. The start and end values indicate the portion of the input array storing data to be operated upon by the current thread in its instance of the recursive quick-sort algorithm. The input array is stored in memory pool 106. If the termination condition provided in command 8 (in which the left array only has one element) is not reached, commands 8-16 are executed, providing for recursively repeating commands 8-16 on the left array as the end point of the left array is adjusted. Otherwise, command 18 is executed.

At command 10, data in the input array lying between the current start and end fields (which are stored as initialization data in the task array for the current thread) is operated on in accordance with the function to be performed. In the present example, the function to be performed is a partition function for sorting the data.

The child place_holder_ID, is computed in command 11 by using a first prefix sum command. The child_place_holder_ID is used as an index in the task array for storing initialization data for the new child thread that will handle the right array. Once the newTID for the child thread is generated a translation is performed in which the child_place_holder_ID is then stored in the relay array[newTID]. In a simple case in which the child_Place_holder_ID is initialized to 1, the prefix-sum command causes child_place_holder_ID to equal the value of place_holder_base, and place_holder_base to be incremented by 1.

The initialization data for the child thread to be spawned is stored in the task array of the new child thread in commands 12 and 13. The initialization data includes the start and end locations in the input array of the data that the child thread to be spawned will operate on. The operator "==" is used for performing a store-confirmation operation in which confirmation is provided when a store operation is completed. In the present example, the confirmation is needed in order that sufficient time be provided for the initialization data to be transferred via the interconnect network 156 for storage in memory pool 106 before execution of command 15, and before the TCU assigned to execute the new child thread executes commands 6 and 7 during its iteration of the parallel segment. The present disclosure is not limited to using the store-confirmation command, and solutions that provide a substantially equivalent function may be used.

In command 14, the s-SPAWN command starts a new child thread in which a prefix-sum operation is performed in which the base is GR-HIGH and the increment is 1. In the ps operation, OR-HIGH is incremented, and the TID to be assigned to the new child thread (newTID) is the value of GR-HIGH before being incremented. The PSFU 130 performs the prefix-sum operation and returns the newTID value to the TCU executing the current thread and announces the new value for GR-HIGH.

Command 15 enters child_place_holder_ID into relay_array[newTID], which in turn removes the spin-wait condition in command 5 of the new child thread, thus providing valid initialization data for the new child thread. In order to work on the left array, the current thread updates the end point of the portion of the input array it will continue to operate on, which is the left array. In the current example the endpoint is updated to p−1 in command 16 and the TCU executing the current thread proceeds to another iteration of the while loop including commands 8-17.

TABLE 1

1. ...
2. //the next 3 commands represent spin-wait
3. do{
4. place_holder_ID = relay_array[$]; //$ is the TID of the current thread
5. }while(place_holder_ID<0);
6. start = tasks[place_holder_ID].start; //establish start and end for current thread
7. end = tasks[place_holder_ID].end;
8. while(start<end) //Is the task completed for current the thread? If yes, go to step 18, otherwise continue
9.     //Partitioning [performing function of current thread]
10.     p = partition(input, start, end); // left array: input[start : p−1], right array: input[p+1 : end]
11.     ps(child_place_holder_ID,place_holder_base); // [get an assigned child place holder ID]
12.     tasks[child_place_holder_ID].start == p+1; //Establish start and end fields for new child thread to correspond to portion of input may not included in start-end of current thread (or operated on by current thread)
13.     tasks[child_place_holder_ID].end == end;
14.     sspawn(newTID)//Effectively, ps(newTID, GR-HIGH);
15.     relay_array [newTID] = child_place_holder_ID; //write data into new child thread's location in relay_array
16.     end = p−1; //reset end field of current thread
17. } //go to Step 8
18. ...

The example shown in TABLE 1 could be modified to include a kspawn command instead of the sspawn command used. In this case, the input array would be partitioned into k+1 partitions, with the current thread continuing to operate on the left most array, k new child threads would be spawned, each being assigned a unique TID via a prefix-sum operation. The initialization data for each of the new child threads would be configured for each of the child threads to execute on a respective array of the k right arrays.

A second program is shown below in TABLE 2, as an example of implementation of a nested s-SPAWN command using the sleep-wait solution. In this exemplary implementation the special location L is an array of elements, each element having a TCU-ID field for storing TCU-ID data and a valid field for storing data indicating if the initialization data or pointers to the initialization data (which is stored in the task array) has been stored and confirmed as stored. The value field stores either a valid or invalid value, indicating that the initialization data has been stored in the proper location or not, respectively. The valid fields of the elements in L are initialized to an invalid value. Once the initialization data is properly stored the valid field is updated to a valid value.

The second program is a portion of a parallel segment of an SPMD program, like the first program, and represents a portion of a child thread spawned by way of a SPAWN statement currently executing on a TCU. Using the sleep-wait implementation the relay-array is not needed, one occurrence of the prefix-sum operation is eliminated, and spin-wait is avoided, providing the advantage of a saving of resource of consumption.

Another advantage is that the translation of addresses provided by the relay-array is not needed, and the initialization data are stored in an array directly accessed with the newTID of the new child thread without using place_holder_ID. Command 2 is a hardware supported command called sleep-wait-read which is an exemplary implementation using an array of locations L, where the elements of L have the properties of a state-machine. Unlike a typical read command in which a value is simply read from a requested address L[$], this command is executed when the value to be read at the requested address is 'valid', but is delayed otherwise. In the case of such delay, the TCU-ID of the TCU executing the requesting thread is stored.

Once the value to be read from L[$] becomes 'valid' the read command is completed. It is assumed that L[$] was initialized to hold invalid values (in the present example, negative values) prior to the first execution of the current parallel segment. The hardware may provide for reinitializing to 'invalid' the value stored in the location L[$] immediately after the read command is complete, since in the present example only one read is expected. Execution of the original SPAWN command, before the child threads are spawned, sleep_wait_read[S] is initialized to hold valid values.

In the present example, a valid value is written into L[$] by a sleep_wait_write command (described further below with respect to command 11) by the parent thread of the thread currently executing. Start and end values for the current thread operating are read in commands 3 and 4. The start and end values indicate the portion of the input array storing data to be operated upon by the current thread in its instance of the recursive quick-sort algorithm. Note that unlike the program code shown in TABLE 1 which applies to the spin-wait solution, start and end are stored in the Task Array at task[$], which is directly addressed with the current thread's TID. If the termination condition in command 5 does not apply, execution of the recursive steps in commands 5-13 begins. The pivot position p is computed in command 7. In command 8 the sspawn command is executed similar to the example in TABLE 1. In commands 9 and 10 the initialization data, including the start and end values, is stored, using the store-confirmation operation, in the task array for the new child thread. In this way, valid initialization data will be stored for the new child thread before it is executed by another TCU, and particularly before that TCU attempts to read the initialization data when it executes commands 3 and 4. The present disclosure is not limited to using the store-confirmation command, and solutions that provide a substantially equivalent function may be used.

Command 11 enters valid a valid value into the valid field of L[newTID] using the sleep_wait_write command. If the TCU executing the new child thread had already read L[newTID] when it executed the sleep_wait_read command, then the TCU waits for L[newTID] to notify it when valid data is written into L[newTID]. The present execution of command 11 then has the effect of completing the read of L[newTID] by the parent executing the new child thread without any further queries by the TCU having its TCU-ID stored in the TCU-ID field. If L[newTID] has not yet been read from, then when the TCU executing the new child thread executes the sleep_wait_read($) command it will be executed substantially like a standard read command since L[newTID] now stores a 'valid' value.

In order to work on the left array, the current thread updates the end point of the portion of the input array it will continue to operate on, which is the left array. In the current example the endpoint is updated to p−1 in command 12 and the TCU executing the current thread proceeds to another iteration of the while loop including commands 5-13.

TABLE 2

1. ...
2. sleep_wait_read(L[$]);//initially location L[$] is invalid; once it become valid the thread $ is notified by the hardware; namely, the read command of L[$] is delayed until valid initialization data is stored; $ is the TID of the current thread
3. start = tasks[$].start;
4. end = task[$].end;
5. while(start<end) {
6. //Partioning
7. p = partition(input,start,end); // left array: input[start : p−1], right array: input[p+1 : end]
8. sspawn(newTID)
9. tasks[newTID].start == p+1;
10. tasks[newTID].end == end;
11. sleep_wait_write(L[newTID]);
12. end = p−1;
13. }
14. ...

While the examples shown in TABLES 1 and 2 illustrate execution of nested SPAWN-type commands in an application for sorting, it is understood that other applications may be used and that the input data to be operated on by the threads may be provided in different formats than the input array illustrated. The initialization data will tell the TCU executing each thread where to access the input data.

It may be necessary to limit the number of virtual threads generated, such as for preventing an explosion in the number of new virtual threads and/or limiting the amount of memory used for storing initialization data. Proposed solutions have been provided by the following references that are herein incorporated by reference in their entirety: U.S. Pat. No. 5,050,070 by D. M. Chastain, entitled "Multi-Processor Computer System Having Self-Allocating Processors"; and Frigo, M., "The Implementation of the Cilk-5 Multi-Threaded Language", Prod. Of the 1998 ACM SIGPLAN Conference on Programming Language Design and Implementation (1998). In one embodiment of the present XMT system 100 described, each time either of OR-HIGH 133 or GR-LOW 135 are changed, GR-HIGH 133 minus GR-LOW 135 is calculated. If the difference exceeds a predetermined first threshold, then the XMT system 100 enters a "suspend" spawning nested threads mode. The suspension is broadcast so that the TCUs will not generate new virtual threads. When the difference drops below a second predetermined threshold, then a broadcast is transmitted that the XMT system may exit the "suspend" mode, and the TCUs may resume executing SPAWN commands and generating new virtual threads.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. An Explicit Multi-Threading (XMT) system for processing multiple spawned threads associated with an XMT program, the XMT system comprising:
    at least one processor;
    a plurality of thread control units (TCUs) each having an associated ID (TCU-ID) and including at least one series of programmable instructions executable by the at least one processor for executing a plurality of child threads, wherein each TCU executes a child thread which is allocated to the TCU, and upon completion of execution of the child thread the TCU is available to execute another child thread, and at least one TCU executes a parent child thread of the plurality of child threads that includes a nested spawn-type command for spawning additional child threads of the plurality of child threads, wherein the parent child thread is related in a parent-child relationship to the child threads that are spawned in conjunction with the nested spawn-type command; and
    a function module for assigning a thread ID (TID) to each child thread which is unique with respect to the other TIDs, and allocating the plurality of child threads to respective TCUs of the plurality of TCUs.

2. The XMT system according to claim 1, wherein:
    a parent thread and a child thread are related to one another, and otherwise the child threads are not related to one another; and
    the plurality of TCUs and the function module interact for providing synchronization of execution of related threads with respect to one another, and for providing substantially asynchronous execution of unrelated threads with respect to one another.

3. The XMT system according to claim 2, wherein for a pair of related threads including a child thread and a parent thread, a first TCU executing the child thread reads initialization data for execution of the child thread from a location designated for storing the initialization data of the child thread, and a second TCU executing the parent thread writes the initialization data into the designated location.

4. The XMT system according to claim 3, wherein the designated location is referenced using the TID of the child thread for which the location is designated for storing its initialization data.

5. The XMT system according to claim 4, wherein when the first TCU is available to execute a child thread it requests and receives from the function module a TID for a child thread to execute, and the synchronization includes:
    the first TCU accessing the designated location suing using the TID received from the function module, and waiting for the initialization data to be successfully written into the designated location.

6. The XMT system according to claim 1, wherein:
    a first TCU executing a nested spawn-type command requests from the function module a TID for each child thread being spawned, and each TID received is designated as a valid TID;
    a second TCU that is available to execute a child thread requests a TID from the function module; and
    the synchronization includes the second TCU waiting for the TED that it requested to become valid before executing the child thread associated with the TID.

7. The XMT system according to claim 2, wherein:
    executing a nested spawn-type command by a parent thread includes requesting from the function module a TID for each child thread being spawned; and
    the function module further comprises at least one global register including GR-HIGH and GR-LOW, wherein GR-LOW is incremented each time that a TCU of the plurality of TCUs completes executing a child thread; and OR-HIGH is incremented each time that a TCU executing a parent thread requests a TED for a child thread being spawned.

8. The XMT system according to claim 7, the function module further comprising a prefix-sum functional unit (PSFU), wherein when a first TCU is available to execute a child thread it requests that the PSFU perform a prefix-sum operation using a base equal to GR-LOW and an increment of 1 to provide a TID, upon which the PSFU provides a TID having the value of GR-LOW to the first TCU and increments GR-LOW.

9. The XMT system according to claim 8, wherein execution of a nested SPAWN-type command by a second TCU executing a parent thread includes requesting that the PSFU perform a prefix-sum operation using a base equal to GR-HIGH and an increment of 1 to provide a TID for each child thread being spawned, for each prefix-sum operation the PSFU provides to the second TCU a unique TID for a respective child thread being spawned, having the initial value of GR-HIGH at the time the prefix-sum operation and increments GR-HIGH.

10. The XMT system according to claim 9, wherein allocating the child thread to the first TCU includes the function module providing the TID associated with the child thread to each of the first and second TCUs.

11. The XMT system according to claim 10, wherein the synchronization is provided when the TID is provided to the first TCU before the second TCU and vice versa.

12. The XMT system according to claim 7, wherein the function module provides a transmission announcing an updated value each time that GR-HIGH is updated and the plurality of TCUs store the updated GR-HIGH.

13. The XMT system according to claim 12, wherein when a TCU is available to execute a child thread it requests and receives from the function module a TID for a child thread to execute, the TCU compares the TID with GR-HIGH, and if the TID is greater than GR-HIGH the TCU enters an idle state in which it waits until the function module announces a value of OR-HIGH which is greater than the TID upon which the TCU executes child tread that is associated with the TID.

14. The XMT system according to claim 8, wherein the nested SPAWN-type command is a k-SPAWN command for spawning k child threads, wherein the PSFU performs a prefix-sum operation for each of the k-child threads and allocates each of the k-child threads to a TCU.

15. The XMT system according to claim 9, further comprising a task array including an array of elements, each element storing initialization data for a child thread of the plurality of child threads; wherein:

before the second TCU requests the PSFU to perform each of the respective prefix-sum operations for providing the TIDs for the respective child thread being spawned, the second TCU requests the PSFU to perform a preliminary prefix-sum operation using a place holder base and an increment of one, to provide a value for a place holder index;

the second TCU stores initialization data for the respective child thread in the element of the task array indexed by the place holder index.

16. The XMT system according to claim 15, further comprising a relay array including an array of elements, each element storing a place holder index that corresponds to the child thread associated with the TID that indexes the element, wherein the elements of the relay array are initialized to an invalid value, and wherein for each respective child thread being spawned after the second TCU is provided by the PSFU with the TID corresponding to the respective child thread:

the second TCU stores the placeholder index for the respective child thread in the element of the relay array indexed by the TID associated with the respective child thread; and the first TCU determines if the value stored in the element of the TCU indexed by the TID that the PSFU provided to the first TCU is valid;

if the value is determined to be invalid the first TCU spin-waits until it becomes valid;

when the value is determined to be valid the first TCU accesses initialization data stored in the element of the task array indexed by the valid value; and the first TCU executes the child thread associated with the TID that the PSFU provided to it using the accessed initialization data.

17. The XMT system according to claim 16, wherein the second TCU confirms that the storing of the initialization data for the respective child thread is completed.

18. The XMT system according to claim 9, further comprising:

a task array including an array of elements, each element storing initialization data for a child thread of the plurality of child threads; and a special location array including an array of elements indexed by TID, each respective element having a TCU-ID field for storing the TCU-ID of a TCU that attempts to access data stored by the element, and valid field for storing an indicator value that indicates when valid initialization data for the child thread associated with the TID indexing the element is ready to be accessed, wherein the indicator value for each element is initialized with a value indicating that the initialization data is invalid;

wherein after the second TCU is provided with the TIDs for the child threads being spawned;

the second TCU stores initialization data associated with each respective child thread being spawned in the element of the task array indexed by the TID associated with the child thread being spawned;

the second TCU stores a value indicating that the initialization data is ready to be accessed in the valid field of each of the respective elements of the special location array indexed by the respective TIDs of each of the child threads being spawned; and the TCU having the TCU-ID stored in the TCU-ID field is notified that the initialization data is ready to be accessed.

19. The XMT system according to claim 18, wherein:

if the value is determined to indicate that the initialization data is not ready, the first TCU waits to be notified that the initialization data is ready to be accessed and stores its TCU-ID in the TCU-ID field indexed by the TID provided to the first TCU by the PSFU;

when the value stored in the valid field of the element of the special location array indexed by the TID provided to it by the PSFU indicates that the initialization data is ready to be accessed the first TCU is notified; and once the first TCU-ID is notified that the initialization data is ready the first TCU accesses the initialization data stored in the element of the task array that is indexed by the TID provided to the first TCU by the PSFU and proceeds to execute the thread having the TID provided to the first TCU by the PSFU.

20. The XMT system according to claim 18, wherein the second TCU confirms that the storing of the initialization data for the respective child thread is completed before storing the value in the valid field of the respective elements of the special location array.

21. A method for processing multiple spawned threads associated with SPAWN-type commands of an Explicit Multi-Threading (XMT) program, the method comprising the steps of:

executing a plurality of child threads by a plurality of TCUs including a first TCU of the plurality of TCUs executing a child thread which is allocated to it;

completing execution of the child thread by the first TCU;

announcing that the first TCU is available to execute another child thread;

executing by a second TCU a parent child thread of the plurality of child threads that includes a nested spawn-type command for spawning additional child threads of the plurality of child threads, wherein the parent child thread is related in a parent-child relationship to the child threads that are spawned in conjunction with the nested spawn-type command;

assigning a thread ID (TID) to each child thread of the plurality of child threads which is unique with respect to the other TIDs; and allocating a new child thread to the first TCU.

22. The method according to claim 21 further comprising the steps of:

reading by the first TCU initialization data for execution of the new child thread from a location designated for storing the initialization data of the child thread; and writing by the second TCU the initialization data into the designated location.

23. The method according to claim 22, wherein the designated location is referenced using the TID of the child thread for which the location is designated for storing its initialization data; and the method further comprising:

requesting and receiving by the first TCU a TID for a child thread to execute when the first TCU is available to execute a child thread; and wherein reading the initialization data by the first TCU includes accessing the designated location using the TID received from the function module.

24. The method according to claim 22, further comprising the step of waiting by the first TCU for the initialization data to be successfully written into the designated location before reading the initialization data.

25. The method according to claim 23, further comprising the steps of:

designating the TIDs associated with the respective child threads being spawned to be valid as they are assigned;

waiting by the first TCU for the TID that it requested and received to become valid before executing the child thread associated with the TID.

26. The method according to claim 23, wherein executing the nested spawn-type command includes requesting a TID for each child thread being spawned, wherein the method further comprises:
providing at least one global register including GR-HIGH and GR-LOW;
incrementing GR-LOW each time that a TCU of the plurality of TCUs completes executing a child thread;
incrementing GR-HIGH each time that a TCU executing a parent thread requests a TID for a child thread being spawned; and
announcing updated values for OR-HIGH to the plurality of TCUs.

27. The method according to claim 26, further comprising the steps of:
comparing the difference between OR-HIGH and GR-LOW to a predetermined first threshold; and
entering a mode to suspend spawning of child threads when the difference exceeds the first threshold until the difference drops below a second predetermined threshold, upon which spawning of child threads is resumed.

28. The method according to claim 26, the method further comprising:
comparing by the first TCU the TID requested and received with the updated version of GR-HIGH;
entering an idle state by the first TCU if the TID is greater than GR-HIGH;
exiting the idle state when the value of GR-HIGH is updated to be greater than the TID; and
executing the child thread that is associated with the requested and received TID by the first TCU when the first TCU exits the idle state.

29. A method for processing multiple spawned threads associated with SPAWN-type commands of an Explicit Multi-Threading (XMT) program, the method comprising the steps of:
executing a plurality of child threads by a plurality of TCUs including a first TCU of the plurality of TCUs executing a child thread which is allocated to it;
completing execution of the child thread by the first TCU;
announcing that the first TCU is available to execute another child thread;
executing by a second TCU a parent child thread of the plurality of child threads that includes a nested spawn-type command for spawning additional child threads of the plurality of child threads, wherein the parent child thread is related in a parent-child relationship to the child threads that are spawned in conjunction with the nested spawn-type command;
assigning a thread ID (TID) to each child thread of the plurality of child threads which is unique with respect to the other TIDs;
allocating a new child thread to the first TCU;
writing by the second TCU the initialization data into the designated location;
reading by the first TCU initialization data for execution of the new child thread from a location designated for storing the initialization data of the new child thread; and
waiting by the first TCU for the initialization data to be successfully written into the designated location before reading the initialization data if the initialization data is not yet written into the designated location;
wherein the designated location is referenced using the TID of the new child thread.

30. The method according to claim 29, further comprising the steps of:
designating the TIDs associated with the respective child threads being spawned to be valid as they are assigned; and
waiting by the first TCU for the TID that it requested and received to become valid before reading the initialization data.

31. The method according to claim 30, further comprising the steps of:
providing a task array including an array of elements, each element provided for storing initialization data for a child thread of the plurality of child threads;
providing a special location array including an array of elements indexed by TID, each respective element having a TCU-ID field for storing the TCU-ID of a TCU that attempts to access data stored by the element, and valid field for storing an indicator value that indicates when valid initialization data for the child thread associated with the TID indexing the element is ready to be accessed, wherein the indicator value for each element is initialized with a value indicating that the initialization data is invalid;
after the second TCU is provided with the TIDs for the child threads being spawned;
storing initialization data associated with each respective child thread being spawned in the element of the task array indexed by the TID associated with the child thread being spawned;
storing a value indicating that the initialization data is ready to be accessed in the valid field of each of the respective elements of the special location array indexed by the respective TIDs of each of the child threads being spawned; and
notifying the TCU having the TCU-ID stored in the TCU-ID field that the initialization data is ready to be accessed.

32. The method according to claim 31, further comprising the steps of:
waiting by the first TCU, if the value is determined to indicate that the initialization data is not ready, to be notified that the initialization data is ready to be accessed;
storing the first TCU's TCU-ID in the TCU-ID field indexed by the TID provided to the first TCU;
accessing the initialization data stored in the element of the task array that is indexed by the TID provided to the first TCU; and
executing the thread having the TID provided to the first TCU.

33. The XMT system according to claim 1, wherein each child thread is provided with three IDs: (i) a natural ID, (ii) a physical ID, and (iii) an assigned thread ID (TID).

* * * * *